United States Patent
Rorie et al.

(10) Patent No.: US 7,147,415 B2
(45) Date of Patent: Dec. 12, 2006

(54) APPARATUS FOR SECURING A SMALL RECREATIONAL VEHICLE

(76) Inventors: Christopher Alan Rorie, 7104 Spruce Pine Trail, Waxhaw, NC (US) 28173; Albert Stephen Rorie, 3120 Rocky River Rd. South, Monroe, NC (US) 28112; Ronald Bennie Cato, 3123 Parks McCorkle Rd., Monroe, NC (US) 28112; Michael Lee Pagoota, 535 Baskins Rd., Chesterfield, SC (US) 29709; Michael Reece Rorie, 4400 Tome Greene Rd., Waxhaw, NC (US) 28173

( * ) Notice: Subject to any disclaimer, the term of this patent is extended or adjusted under 35 U.S.C. 154(b) by 0 days.

(21) Appl. No.: 10/814,611

(22) Filed: Mar. 31, 2004

(65) Prior Publication Data

US 2005/0220557 A1    Oct. 6, 2005

(51) Int. Cl.
*B60P 7/08* (2006.01)
(52) U.S. Cl. .............................................. 410/7; 410/3
(58) Field of Classification Search ................ 410/2–4, 410/7, 77, 80; 224/403, 533, 47.4, 552, 567; 248/500, 503
See application file for complete search history.

(56) References Cited

U.S. PATENT DOCUMENTS

| | | | |
|---|---|---|---|
| 5,749,685 A | 5/1998 | Hain | |
| 5,765,851 A | 6/1998 | Parent | |
| 5,788,255 A | 8/1998 | Hayes et al. | |
| 5,816,757 A * | 10/1998 | Huston | 410/3 |
| 5,833,412 A * | 11/1998 | Valencia et al. | 410/2 |
| 5,853,187 A | 12/1998 | Maier | |
| 6,050,737 A | 4/2000 | Russell | |
| 6,077,004 A | 6/2000 | Denman, Jr. | |
| 6,099,219 A | 8/2000 | Bartholomay | |
| 6,109,494 A | 8/2000 | Pilmore | |
| 6,139,235 A * | 10/2000 | Vander Koy et al. | 410/111 |
| 6,450,472 B1 * | 9/2002 | Cook, Jr. | |
| 6,461,095 B1 | 10/2002 | Puska | |

OTHER PUBLICATIONS www.sportsmanguide.com—ATV lock for the Sportman's Guide. A catalog and internet company. 2 pages/prints.

* cited by examiner

*Primary Examiner*—Stephen Gordon
(74) *Attorney, Agent, or Firm*—Dority & Manning, P.A.

(57) ABSTRACT

An apparatus for securing a small recreational vehicle to a bed of a towing vehicle or to a grounding member is provided. The apparatus includes a mounting shaft that is securably positionable proximal to the bed of the towing vehicle or mountable on a grounding member. A receiver is operably attachable to the mounting shaft. A securing device, for example, securing ring, that is attachable to the small vehicle securably engages the receiver to hold the small recreational vehicle on the bed of the towing vehicle or to fasten the small recreational vehicle to the grounding member. In a further embodiment, the apparatus includes a receiver mounting plate that is securably mountable to a sidewall of a bed of a towing vehicle or to a grounding member. A receiver is disposed on the receiver mounting plate, and a securing ring is attachable to said small recreational vehicle. The securing ring securably engages the receiver to hold the small recreational vehicle on the bed of the towing vehicle or to fasten the small recreational vehicle to the grounding member.

10 Claims, 7 Drawing Sheets

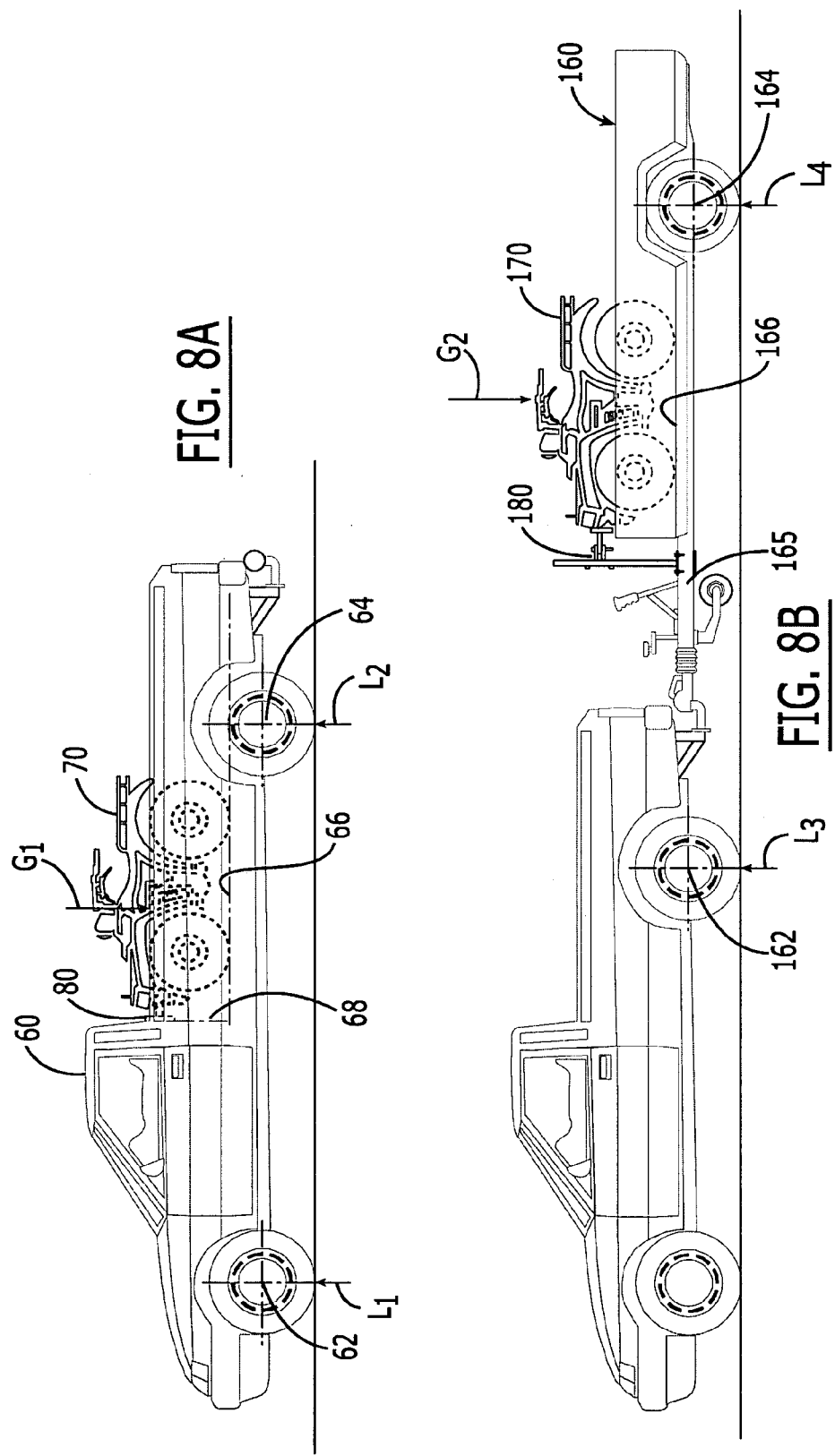

APPARATUS FOR SECURING A SMALL RECREATIONAL VEHICLE

BACKGROUND OF THE INVENTION

The present invention relates generally to an apparatus for securing a small recreational vehicle to a bed of a towing vehicle. In particular, the invention relates to an apparatus for securing an all terrain vehicle ("ATV") or other small recreational vehicle to a trailer or a bed of a pickup without the use of tie down straps or ropes.

FIELD OF THE INVENTION

ATVs and other small recreational vehicles oftentimes must be transported to sites where they are to be driven. To transport the ATV or other small vehicle, the vehicle is usually loaded onto a bed of a pickup truck or a flatbed of a trailer. Once the vehicle is loaded, the ATV is secured to the bed of the pickup or towing vehicle through the use of chains or ropes which are wrapped around various parts of the ATV, including the wheels, axles, and towing hitch. These chains and ropes or other tie down straps are hard to handle and time consuming to attach to the flatbed and the vehicle while at the same time they are often inadequate for securing the vehicles to the pickup trucks or trailers. Oftentimes there is a danger of these chains, ropes, and tie down straps of working their way loose, thereby creating the potential for damage to the towing vehicle, nearby traffic, or the small vehicle itself.

Different securing systems and anchoring assemblies have been devised to secure the ATVs or other small vehicles to a bed of a pickup or trailer that limit the use of chains, ropes, and tie down straps. Several systems or assemblies require the user to attach a mounting assembly to the flatbed itself of a pickup or a trailer. Such systems have at least two problems.

By attaching an assembly to the flatbed itself, valuable space, which can be used to haul other equipment or items besides the vehicle, is consumed, thereby limiting the opportunity to maximize the available storing capacity of the pickup truck or the trailer on which the vehicle is placed. A greater concern for the use of assemblies that are attached to the flatbed itself is that such assemblies can compromise the center of gravity for the towing vehicle. On single axle trailers and flatbeds of pickup trucks the optimum placement for the load is between the two supporting axles of the vehicles. For example, for a single axle trailer, the placement of the load will preferably be between the back axle of the transport vehicle to which the trailer is hitched and the axle of the trailer itself. For a pickup truck, it is preferable to place added weight between the front axle of the truck and the back axle. Preferably, the weight of a vehicle loaded on the flatbed of a trailer or a pickup truck will place most of its weight if not all of its weight between these two supporting axles.

By using assemblies that must be attached to the flatbed, the ability to place the small vehicle on the flatbed in a position that optimizes the center of gravity for the towing vehicle can be compromised. In order for the assemblies to be useful and not overly complicated to use, these assemblies must be attached to the front of the bed between the two supporting axles to allow for easier removal and loading of the vehicle on the flatbed. If the assembly was placed on the back of the bed, it would require the assembly to be unattached every time the vehicle is moved on or off of the bed. By placing the assembly at the front of the bed of the trailer or pickup truck, the bed is effectively shortened and by consequence, the vehicle is moved closer to the back supporting axle. If such a bed is not long enough, then part of the weight of the vehicle will actually be on the outside of the back supporting axle. Such a situation at best does not maximize the center of gravity of the loaded towing vehicle. At worse, it can disrupt the center of gravity of the towing vehicle, causing an unsafe condition for transporting the small vehicle at all but the slowest speeds. By not maximizing the center of gravity of the towing vehicles, these assemblies create opportunity for damage to the towing vehicles as well as unsafe conditions for transporting the small vehicle.

A need still exists for an apparatus for securing a small recreational vehicle to a bed of a towing vehicle that can be easily used to secure the small vehicle while at the same time optimize the towing space and the center of gravity of the towing vehicle.

SUMMARY OF THE INVENTION

Various features and advantages of the invention will be set forth in part in the following description, or may be obvious from the description, or may be learned through practice of the invention.

The present subject matter provides for an apparatus for securing a small recreational vehicle such as an ATV, snowmobile, lawnmower, etc. to a bed of a towing vehicle. The apparatus has a mounting shaft securably positionable proximal to a bed of a utility vehicle. A receiver is operably attached to the mounting shaft to receive a securing device, for example, a securing ring from a securing ring assembly, that has been attached to the small recreational vehicle. The securing ring securably engages the receiver when the small recreational vehicle is placed on the bed of the towing vehicle, thereby holding the small recreational vehicle on the bed of the towing vehicle. The receiver may be adjustable along the mounting shaft to allow alignment with the securing ring assembly that is attached to the small recreational vehicle.

In an exemplary embodiment, the receiver comprises a U-shaped bracket with parallel arms extending outward from the mounting shaft. The securing ring fits between the parallel arms of the U-shaped bracket to secure small recreational vehicle to the towing vehicle. In some embodiments, the parallel arms define apertures therein to which fastening device, such as a hitch pin, is positionable. In such embodiments, the securing ring is placed between the parallel arms so that an aperture formed in the securing ring aligns with the apertures formed in the parallel arms. The hitch pin may be placed through both the parallel arms and the securing ring to fasten the securing ring assembly and thereby the small recreational vehicle to the securing apparatus attached to the towing vehicle. The securing ring may then be locked to the receiver. Also a lock may be used instead of a hitch pin to be placed through the apertures of the parallel arms and the securing ring. Other devices may also be used instead of a hitch pin to fasten the securing ring to the receiver.

The securing ring assembly may be made up of a securing ring that is mounted to a ring plate. The ring plate may be mountable to different parts of the small recreational vehicle including a bush guard or other parts of the frame of the small recreational vehicle. The securing ring assembly may also include a holding plate which is attachable to the ring plate around a portion of the small recreational vehicle, thereby securing the securing ring assembly to the small recreational vehicle without altering the small recreational vehicle.

The towing vehicle may be a vehicle such as a truck that has a flatbed or a trailer, which could be attached to the back of an automobile. In such embodiments where the towing vehicle is a trailer, a mounting shaft can be attached to the tongue of the trailer, which is attachable to a trailer hitch on an automobile.

In embodiments where the towing vehicle is a truck, a receiver mounting plate having a unitary U-shaped receiver may be securably mounted to a side wall of the bed of the truck. As described above, a securing ring of a securing ring assembly attached to a small recreational vehicle may then engage a receiver to hold the small recreational vehicle in the bed of the truck. In these embodiments where the securing apparatus is comprised of a unitary U-shaped receiver which is mountable to a side wall of a bed of a towing vehicle, the receiver may be adjustable along a mounting plate to adjust for different placements of the securing ring assembly and for different sizes of the small recreational vehicles.

In some embodiments of the present subject matter, the mounting shaft used in the securing apparatus may be a U-shaped channel strut. The receiver may be placed in the channel to add lateral support to the receiver as well as to prevent easy detachment of the receiver from the mounting shaft when the securing ring assembly attached to the small recreational vehicle has engaged the receiver.

In further embodiments, the receiver may be integral to the mounting shaft. While in other embodiments, the receiver may be adjustable along the mounting shaft. By having the receiver adjustable along the mounting shaft, the mounting shaft may be made of a unitary structure, (meaning it is a single unit, not consisting of two separate pieces) while still allowing for proper alignment of the receiver with different positions of the securing ring on a small recreational vehicle or with the different sizes of small recreational vehicles. Further, by having the receiver adjustable along the mounting shaft instead of having the mounting shaft adjustable, the strength of the mounting shaft is not compromised.

In embodiments of the securing apparatus that use a unitary mounting shaft with a receiver attached thereto or in the embodiment, that employ a unitary U-shaped receiver mounted to a mounting plate, both the mounting shaft and the mounting plate may be affixed to a grounding member or a stable structure such as a wall, a driveway, a foundation, etc., to secure the small recreational vehicle from theft. These stationary positionings of the securing apparatuses allow all the user of the small recreational vehicle to lock up the vehicle when not in use, thereby deterring theft of such a vehicle.

In a further embodiment, the securing apparatus includes a mounting shaft which extends in a longitudinal length and has a first end and a second end at opposite ends of the longitudinal length of the mounting shaft. A mounting base is integral to the shaft at the first end. The mounting base can be attached to the tongue of the towing vehicle by having the mounting base interact with and engage a holding plate so that the second end of the shaft extends above the bed of the towing vehicle. A U-shaped receiver may then be operably attached to the shaft by securing bolts. The U-shaped receiver has parallel arms and extend outward from the shaft when the receiver is attached thereto. The parallel arms each define an aperture which are in parallel alignment with each other.

A securing ring that defines a ring aperture may then be attached to the small recreational vehicle. The securing ring fits between the extended arms of the U-shaped receiver when the small vehicle is placed on the bed of a towing vehicle so that the securing ring extends past the apertures defined in the parallel arms, thereby aligning the aperture formed by the securing ring with the apertures in the parallel arms.

A removable fastening device can then be positioned in the apertures in the parallel arms and through the ring aperture of the securing ring. This securing ring, which is attached to the small recreational vehicle, engages the receiver so that the small recreational vehicle is secured to the bed of the towing vehicle. To accommodate different sized small recreational vehicles or to accommodate different placements of a securing ring, the receiver may be adjustable along the mounting shaft.

Other features of the present invention will be described in greater detail below through the use of appended figures.

BRIEF DESCRIPTION OF THE DRAWINGS

FIGS. 8A and 8B show side views of small recreational vehicles secured to beds of towing vehicles using two embodiments of the securing apparatuses according to the present subject matter.

DETAILED DESCRIPTION

Reference will now made in detail to the presently preferred embodiments of the invention, one or more of examples of which are shown in the figures. Each example is provided to explain the invention, and not as limitations of the invention. In fact, features illustrated or described as part of one embodiment can be used with another embodiment to yield still a further embodiment. It is intended that the present invention cover such modifications and variations.

Figure 1:
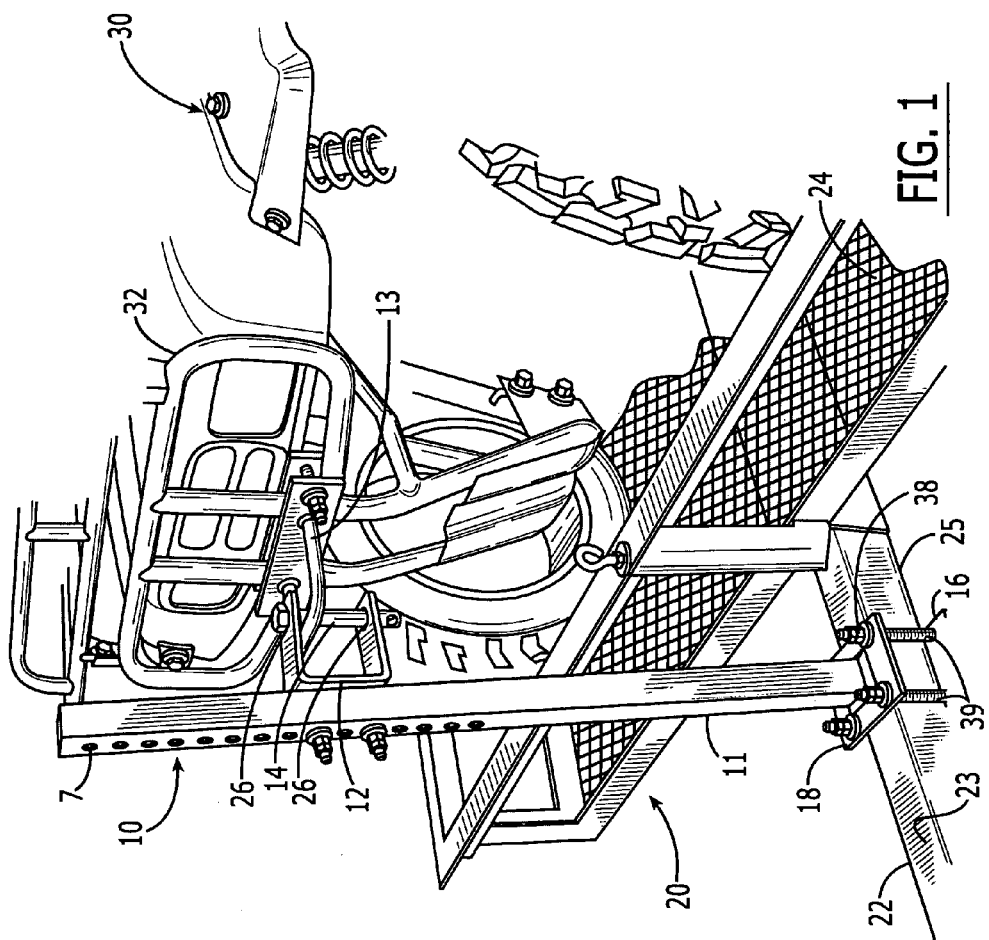
FIG. 1 shows a perspective view of an embodiment of a securing apparatus for securing a small recreational vehicle to a bed of a towing vehicle according to the present subject matter.

FIG. 1 shows an exemplary embodiment of a securing apparatus, generally 10, used to secure a small recreational vehicle to a bed of a towing vehicle. In particular, in FIG. 1, the securing apparatus 10 is secured to a tongue 22 of a towing vehicle, or trailer, generally 20. The trailer 20 has a flatbed 24 on which a small recreational vehicle, or, in this case, an all terrain vehicle ("ATV") generally 30, is placed.

The securing apparatus 10 has a mounting shaft 11 integral to a mounting base 18. To attach the mounting shaft 11 to the tongue 22, the mounting base 18 can be connected to a holding plate 16 by securing bolts 39 and securing nuts 38. The mounting base 18 is placed on the bedside 23 of the tongue 22 while the holding plate is placed on the roadside 25 of the tongue 22. Securing bolts 39 are then placed through apertures in the holding plate 16 and the mounting base 18 in a known manner. Securing nuts 38 are then screwed onto the securing bolts 39 to tighten and hold the mounting base 18 and the mounting shaft 11 in an erect position above the flatbed 24 of the trailer 20. Other manners for securing the mounting shaft 11 to the trailer tongue 22 as are known in the art may be used. For example, the mounting shaft 11 may be welded onto the tongue 22 or may be removable attached in some other manner.

The securing apparatus 10 also includes a receiver 12 which can be mountably attached to the mounting shaft 11. In the example shown in FIG. 1, the receiver 12 is a U-shaped bracket which opens toward the bed 24 of the trailer 20. When the small recreational vehicle 30 is driven, pushed or placed on the flatbed 24 of the trailer 20, a securing device, or securing ring assembly, 13 engages the receiver 12 to allow the small recreational vehicle 30 to be locked onto the trailer. In an exemplary embodiment, a portion of the securing ring assembly enters the U-shaped receiver 12, and a fastening device 14, which has a hitch pin, is then placed through apertures 26 (see FIG. 2) formed in the arm of the U-shaped receiver. The fastening device 14 fastens the securing ring assembly 13 and thus by the small recreational vehicle 30 to the mounting shaft, thereby holding the small recreational vehicle 30 to the flatbed 24 of the trailer 20. The securing ring assembly 13 can be attached to any portion of the small recreational vehicle 30 that will hold the small recreational vehicle 30 in place on the flatbed 24. Preferably, the securing ring assembly 13 will attach to a portion of the frame of the small recreational vehicle 30. In the embodiment shown, the securing ring assembly 13 is attached to a bush guard 32 of the ATV 30.

Figure 2:
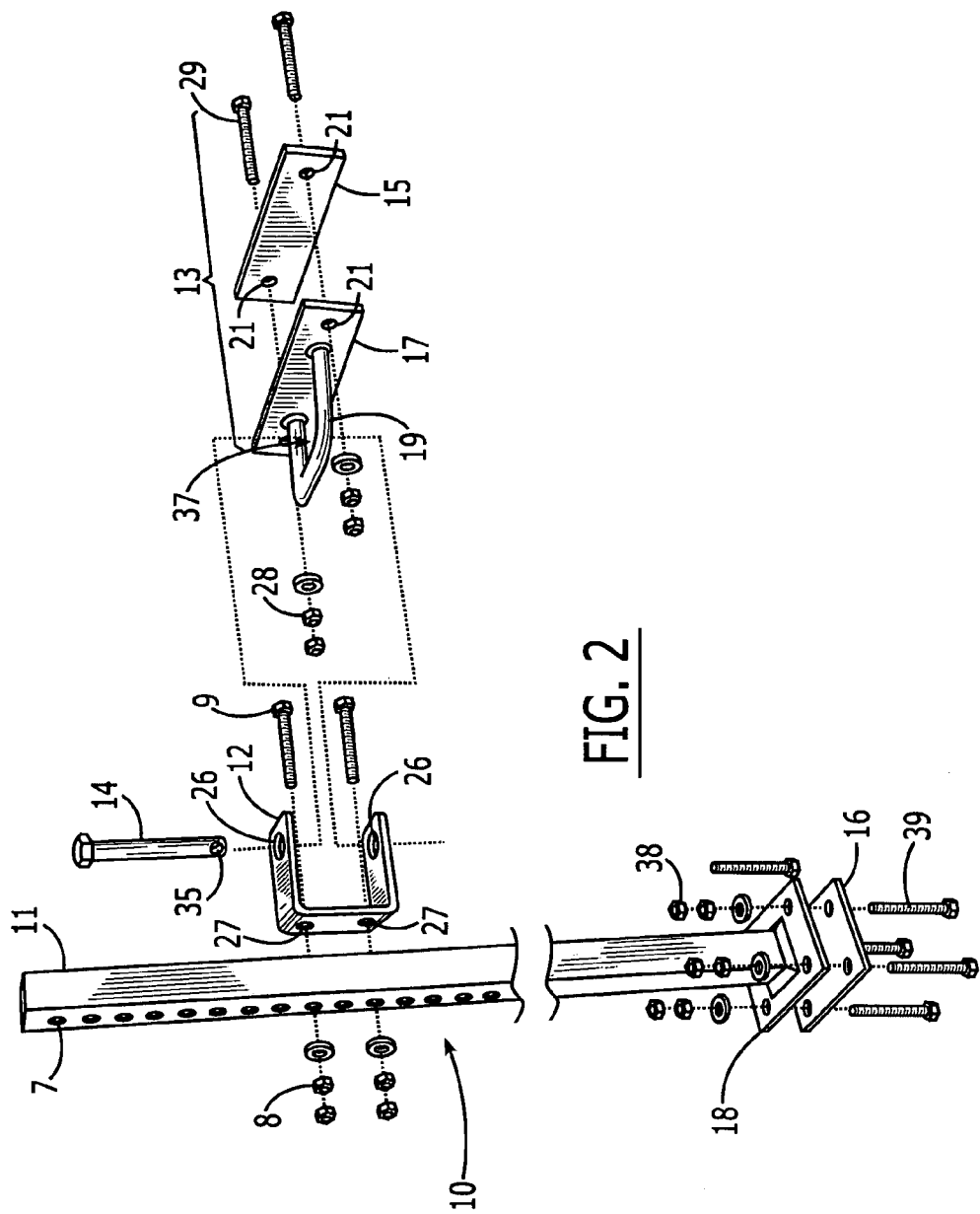
FIG. 2 shows an exposed view of an embodiment of the securing apparatus according to the present subject matter.

FIG. 2 shows an exploded view of the securing apparatus 10. As stated before, the mounting shaft 11 may be put in the proper position by placing the mounting base 18 integral to the mounting shaft 11 on the tongue of a trailer or other device and connecting a holding plate 16 opposite the mounting base 18. For example, the mounting base 18 may be fastened to the holding plate 16 through the use of the securing bolts 39 and securing nuts 38. By using the securing nuts 38 and securing bolts 39, the mounting shaft may be securely fastened to a tongue of a trailer or some other device to allow the mounting shaft to be proximal to the flatbed on which a small recreational vehicle is to be placed. At the same time, the securing nuts 38 and the securing bolts 39 allow the securing apparatus 10 to be removal and/or adjustable.

The mounting shaft 11 shown in the embodiment of FIG. 2 is a four-walled shaft having mounting apertures 7 defined through the walls that run parallel to the flatbed of a vehicle when the shaft 11 is properly mounted. The receiver 12 can be mounted to the mounting shaft 11. The U-shaped receiver has mounting apertures 27 which can be aligned with mounting apertures 7 of the mounting shaft 11, thereby allowing securing bolts 9 to be inserted through both the mounting apertures 27 of the receiver 12 and the mounting apertures 7 of the mounting shaft 11. Securing nuts 8 may then be screwed onto the securing bolts 9 to secure the receiver 12 to the mounting shaft 11.

Figure 3:
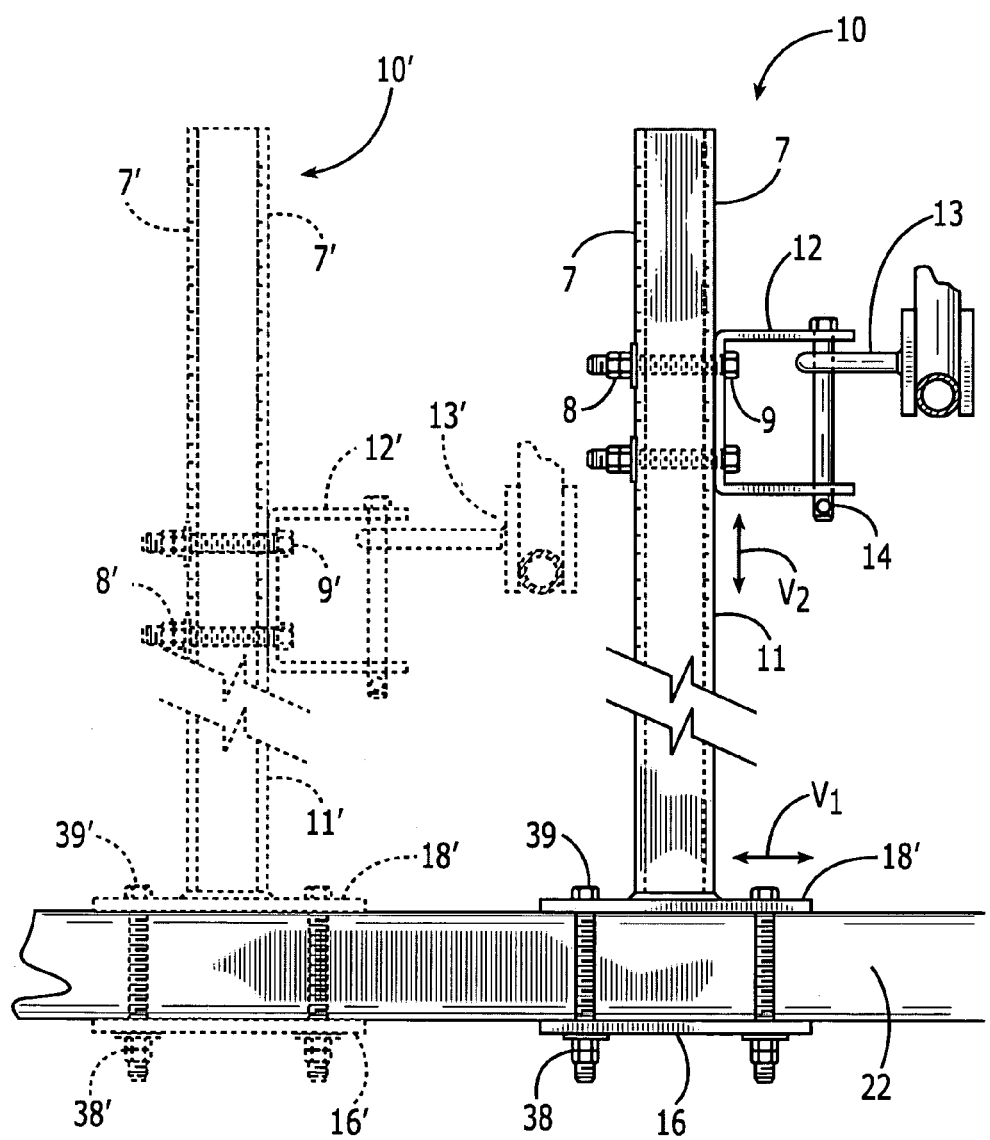
FIG. 3 shows side views of two positions of the securing apparatus on a tongue of a towing vehicle according to the present subject mater.

As can be seen in FIG. 3, due to the multiple mounting apertures 7 within the mounting shaft 11, the placement of the receiver 12 is adjustable in the vertical direction of the arrows $V_2$. Further, as stated before, the mounting shaft 11 is also adjustable in a horizontal direction as shown by the arrows $V_1$. These adjustable combinations of the mounting shaft and the U-shaped receiver allow for the adjustment of the securing device to adapt to different sized small recreational vehicles. For example, in FIG. 3, the receiver 12 of the securing apparatus 10 shown in the solid lines is positioned for the right height of the securing ring 13, which may be attached to a larger vehicle or attached where the placement of the securing ring assembly is at a higher position on the vehicle. The placement of the receiver 12 so that the securing bolts 9 may be properly placed through the appropriate mounting apertures 7 and then secured through the securing nuts 8 allow for the proper alignment of the receiver 12 to accept the securing ring assembly 13, thereby allowing the hitch pin 14 to fasten the small recreational vehicle to the mounting shaft 11.

This same mounting shaft can be adjusted to fit a different vehicle, for example, a snowmobile, which may extend further into the area of the tongue 22, of a flatbed and may require the securing ring assembly to be attached at a lower position as depicted in FIG. 3 as securing apparatus 10' (shown in a dotted outline in FIG. 3). Securing apparatus 10' has been moved further back along the tongue 22 away from the flatbed by loosening the securing nut 38' and the securing bolt 39' to allow the securing apparatus 10' to be shifted. When the securing apparatus 10' is in its proper place, the securing bolts 39' and the securing nuts 38' may be tightened to secure the mounting plate 18' and the holding plate 16' to the tongue 22, thereby fastening the securing apparatus 10'. To accommodate for the lower location of the securing ring 13', the receiver 12' may be removed from its other location and secured to a lower location by placing the securing bolts 9' in the proper mounting aperture 7' and then tightening the U-shaped receiver 12' to the mounting shaft 11' by tightening the securing nuts 8' on the securing bolts 9'. In this manner, the receiver 12' may be adjusted to receive the securing ring 13' that is positioned in a different location on the same vehicle, or placed on a different vehicle.

Referring back to FIG. 2, it can be seen that the securing ring assembly 13 may be composed of multiple parts. In the shown embodiment, the securing ring 13 has a ring 19 attached to a ring plate 17. The ring plate 17 has mounting apertures 21 placed on either side of the securing ring 19. The securing ring assembly 13 also includes a holding plate 15 that may be placed on the opposite side of the portion of the small recreational vehicle to which the securing ring assembly will be attached. As with the ring plate 17, the holding plate 15 has mounting apertures 21 that will align with the mounting apertures 21 of the ring plate 17. In some embodiments, it may be preferable to have multiple sets of mounting apertures in both the holding plate and the ring plate to allow the ring assembly 13 to be adaptable to different positions on a small recreational vehicle or be adaptable to different types of small recreational vehicles. Once the mounting apertures 21 of the holding plate 15 and the ring plate 17 are properly aligned, mounting bolts 29 may be inserted through the mounting apertures of the ring plate 17 and the holding plate 15 to secure the securing ring assembly 13 to the small recreational vehicle. Securing nuts 28 may then be screwed onto the securing bolts 29 to securely hold the securing ring assembly to the small recreational vehicle.

The securing ring 19 forms a ring aperture 37 which allows the securing ring assembly and thereby the small recreational vehicle to be securely attached to the mounting shaft 11 and thereby to the bed of the towing vehicle to which the mounting shaft 11 is attached. The ring 19 enters the receiver 12 so that the aperture 37 is aligned with the locking apertures 26 in the arms of the receiver 12. At this point, a hitch pin 14 or other device which may be inserted through the locking apertures 26 as well as the ring aperture 37 to secure the ring assembly 13 to the mounting shaft 11. In the embodiment shown in FIG. 2, the hitch pin 14 has a locking passage 35, which passes through an end portion of the hitch pin 14. This locking passage 35 allows a lock or a cotter pin to be placed through the hitch pin 14 to lock the hitch pin 14 in place, thereby further securing the securing ring assembly 13 to the mounting shaft 11. In this manner, the small recreational vehicle may be secured to a flatbed of the towing vehicle.

While not necessary, it is beneficial to place the securing ring assembly 13 on the front of a small recreational vehicle, like an ATV, for example. By placing the securing ring assembly 13 on the front portion of an ATV, the ATV can be driven onto the bed of a trailer, truck, or other towing vehicle and the securing ring 19 can be easily aligned with the receiver 12. When the securing ring assembly is placed on the back of an ATV, the ATV, is most cases, has to be walked onto the bed. At the same time, maneuvering the ATV to align the securing ring 13 with the receiver 12 is also harder because steering of the ATV is done at the end of the ATV furthest away from the securing ring 19, receiver 12, and the point of attachment.

Figure 4:
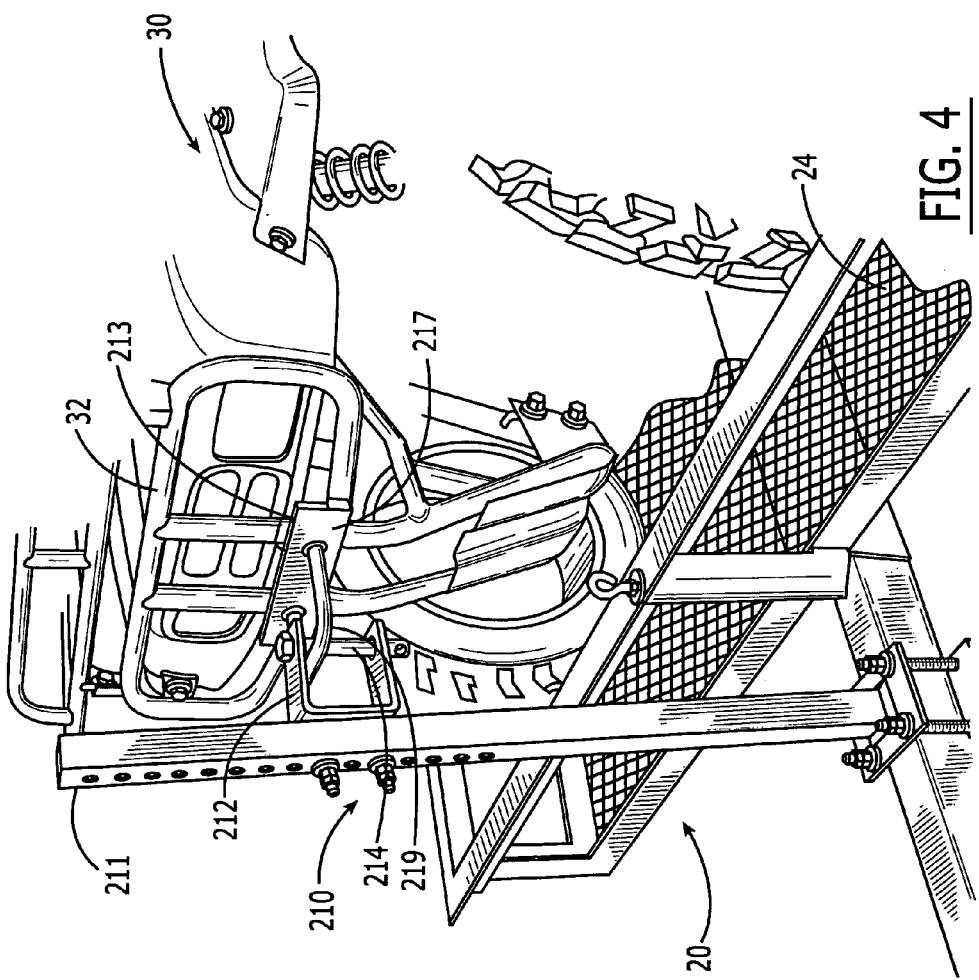
FIG. 4 shows a perspective view of a further embodiment of the securing apparatus in operation on a towing vehicle to secure a small recreational vehicle to the towing vehicle in accordance with the present subject matter.

FIG. 4 illustrates a further embodiment of a securing device, generally 210. As with previous embodiments, a mounting shaft 211 may be mounted proximal to a flatbed 24 of a towing vehicle, or in this case a trailer, generally 20. The mounting shaft 211 has a U-shaped receiver 212 securely mounted thereto. To secure the small recreational vehicle 30 to the mounting shaft 211, a securing ring assembly 213 is permanently attached to a portion of the small recreational vehicle 30, in particularly, a bush guard 32. Unlike the previously securing ring assemblies, the securing ring assembly 213 is permanently attached to the bush guard 32. In this manner, it makes it harder for someone interested in improperly removing the vehicle from the bed of the towing vehicle from doing so by preventing such a person from detaching the securing ring assembly 213 from the small recreational vehicle 30. In such an embodiment, the securing ring 213 is made up of a ring plate 217 and a securing ring 219. The ring plate 217 in this example is welded to the bush guard 32 of the small recreational vehicle 30.

Other shapes and designs of ring plate assemblies which may be permanently attached or which may be removably attached to small recreational vehicles can be used without departing from the scope of this invention. For example, a single ring may be screwably attached, welded, or clamped to the frame or some other securable place on a small recreational vehicle. The use of securing bolts and securing nuts are not required. Further, a securing ring attached to a ring plate may also be screwably attached to the small recreational vehicle without the benefit of a holding plate. Other examples of the securing ring assemblies are also known in the art and are covered by the scope of the present invention.

Figure 5:
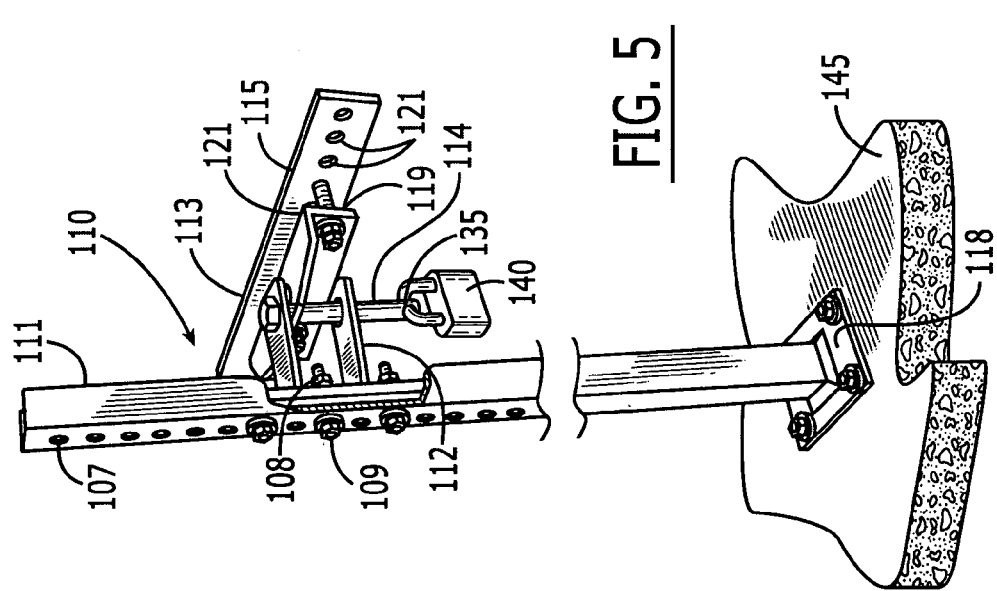
FIG. 5 shows a perspective view of a further embodiment of a securing apparatus according to the present subject matter.

FIG. 5 shows a further embodiment of a securing apparatus 110. In this embodiment, the securing apparatus 110 has a mounting shaft 111 which is a U-shaped channel strut that is attached to a mounting base 118. In operation, a receiver 112 having parallel arms is placed in the channel of the mounting shaft 111 so that the arms of the receiver 112 extend outward. The receiver 112 may be attached at an appropriate height to align a receiver with a securing ring assembly 113, which may be attached to a small recreational vehicle. To obtain the proper alignment, an aperture in the portion of receiver 112 running parallel to the shaft 111 is aligned with an appropriate mounting aperture 107 through which a securing bolt 109 is placed. A securing nut 108 is then tightened onto the security bolt 109 to securely attach the receiver 112 to the mounting shaft as can be seen in the cut a way view of the mounting shaft 111. By having the receiver placed on the inside of the channel in shaft 111, the receiver 112 is prevented from being twisted around the securing bolt 109. Further, such placement of receiver 112 in the shaft 111 adds lateral support to the receiver 112.

The bolt in this example is place inward through the appropriate mounting aperture 107 so that the threaded end extends through the channel of the mounting shaft 111. The securing nut 108 is then tightened onto the bolt 109. In this manner, when the securing ring assembly 113 is in an engaged position in the receiver 112, the receiver 112 cannot be loosened from the mounting shaft 111. Thereby, possible theft may be deterred.

A securing ring assembly 113 of the securing apparatus 110 also has a different configuration. The securing ring 119 is cut out of an L-shaped bracket. In this manner, the securing ring 119 serves as the ring as well as the ring plate. Such a securing ring 119 is easily manufactured out of an L-shaped material which can be stamped to form the ring aperture through which a hitch pin 114 may pass. The securing ring 119 may be attached through securing bolts and securing nuts to a holding plate 115. As described above, mounting apertures 121 in both the securing ring 119 and the holding plate 115 may be aligned to allow insertion of a bolt or some other securing device. In some embodiments, multiple sets of mounting apertures 121 may be placed in the securing ring 119 and the holding plate 115 (only shown in the holding plate 15 in FIG. 5) to allow the securing ring assembly to be attached to different small recreational vehicles or to be attached to the same vehicle in different locations.

Once the securing ring 119 of the securing ring assembly 113 is placed between the arms of the receiver 112, the hitch pin 114 may be placed through locking apertures in the arms of the receiver 112 and the ring aperture of securing ring 119. A lock 140 may then be placed through a passage 135 in the hitch pin 114 to lock the securing ring to the mounting shaft. In this manner, the small recreational vehicle is also secured to the mounting shaft.

The embodiment shown in FIG. 5 may also be used to secure the small recreational vehicle in a stationary position. The mounting shaft 111 may be attached to a grounding member 145 such as a cement slab, paved driveway, or some other foundation. Also, the grounding member 145 may be a wall or some other stationary non-movable object. In cases where a wall is used, the mounting shaft may be constructed at a right angle so that the mounting shaft is actually one unitary piece to add strengthened stability to prevent bending or breaking of the mounting shaft. In this manner, the mounting shaft may be mounted to a side of the wall and still allow a small recreational vehicle to be positioned so that it may engage the receiver 112.

The mounting shaft 11, 111, 211 of FIGS. 1 through 5 are constructed of a unitary piece of metal or other material which may withstand the forces place upon on it. By having mounting apertures 7, 107 placed in at least one side of the mounting shaft to allow the receiver 12, 112, 212 to be adjustable up and down, a situation is avoided where the mounting shaft has to be in two pieces to allow it to be adjustable. By having the mounting shaft 11, 111, 211 as a unitary piece, the strength of the mounting shaft 11, 111, 211 is not compromised. If the mounting shaft itself had been made adjustable by being made in two pieces, then it is possible that you are creating weak points within the mounting shaft, thereby making it easier for the small recreational vehicle to be detached from the towing vehicle or a nonmovable object depending on the use of securing apparatus 10, 110, 210. Therefore, the unitary mounting shaft is beneficial for use in a securing apparatus 10, 110, 210.

Figure 6:
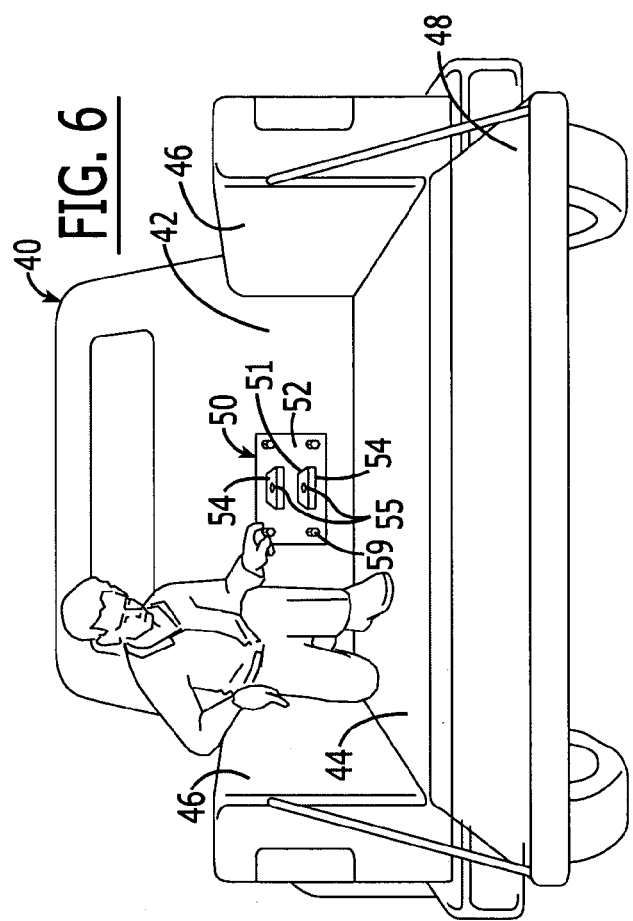
FIG. 6 shows a perspective view of another embodiment of a securing apparatus attached to a side wall of a bed of a truck according to the present subject matter.

FIG. 6 shows a further embodiment of the present subject matter. A securing apparatus 50 is attached to a front sidewall 42 of a towing vehicle 40, in this example, a truck. The securing apparatus comprises a mounting plate 52 which can be secured to the front side wall 42 by securing bolts 59 in a known manner. The mounting plate may have a receiver 51 which possesses parallel arms 54 that create a receptacle for a securing ring assembly or a securing ring which may be attached to a small recreational vehicle that is to be loaded onto a bed 44 of the towing vehicle 40. As shown in this embodiment, the receiver 51 and its parallel arms 54 may be permanently attached to the mounting plate 52. In such an arrangement, multiple holes may be drilled into the front side wall 42 to allow the mounting plate 52 and receiver 51 to be adjusted to the right height to accommodate securing rings positioned at different heights. As discussed above, parallel arms 54 define locking apertures 55, which allow a lock or a hitch pin or some other device to be inserted through the apertures to secure the small recreational vehicle to the bed of the truck 40.

It should be understood by those skilled in the art that other types and designs of receivers may be used in combination with the mounting shaft and the securing ring assembly to form a securing apparatus. These receivers may be self-locking, which, once engaged by a securing ring, automatically hold the ring and do not permit the ring to become loose until such time that a release mechanism is activated. It should be understood that the present subject matter includes such receivers as well as other receivers which are known in the art.

In such embodiments as shown in FIG. 6, it is beneficial to have the securing apparatus 50 centered on the front side wall 42 between the two parallel side walls 46 of the towing vehicle 40 when the securing ring assembly is attached to a center position on the small recreational vehicle. In this manner, the weight of the small recreational vehicle is distributed evenly on the flat bed 40 in a known manner. At such point in time that the vehicle is properly placed on the flatbed 44 of the towing vehicle 40 the tailgate 48 may then be closed.

In FIGS. 1 through 4, with the mounting shafts 11, 211 secured to the tongue 22 of a trailer 20, the mounting shafts 11, 211 and the receivers 12, 212 attached to the mounting shaft 11, 211 are centered relative to the flatbed 24 of the trailer 20. Thereby, if the securing ring assembly 13, 213 is centered on the small recreational vehicle, then the weight of the small recreational vehicle 30 should be evenly distributed across the length of the flatbed 24. Such a design helps to stabilize the trailer 20 during travel.

Figure 7:
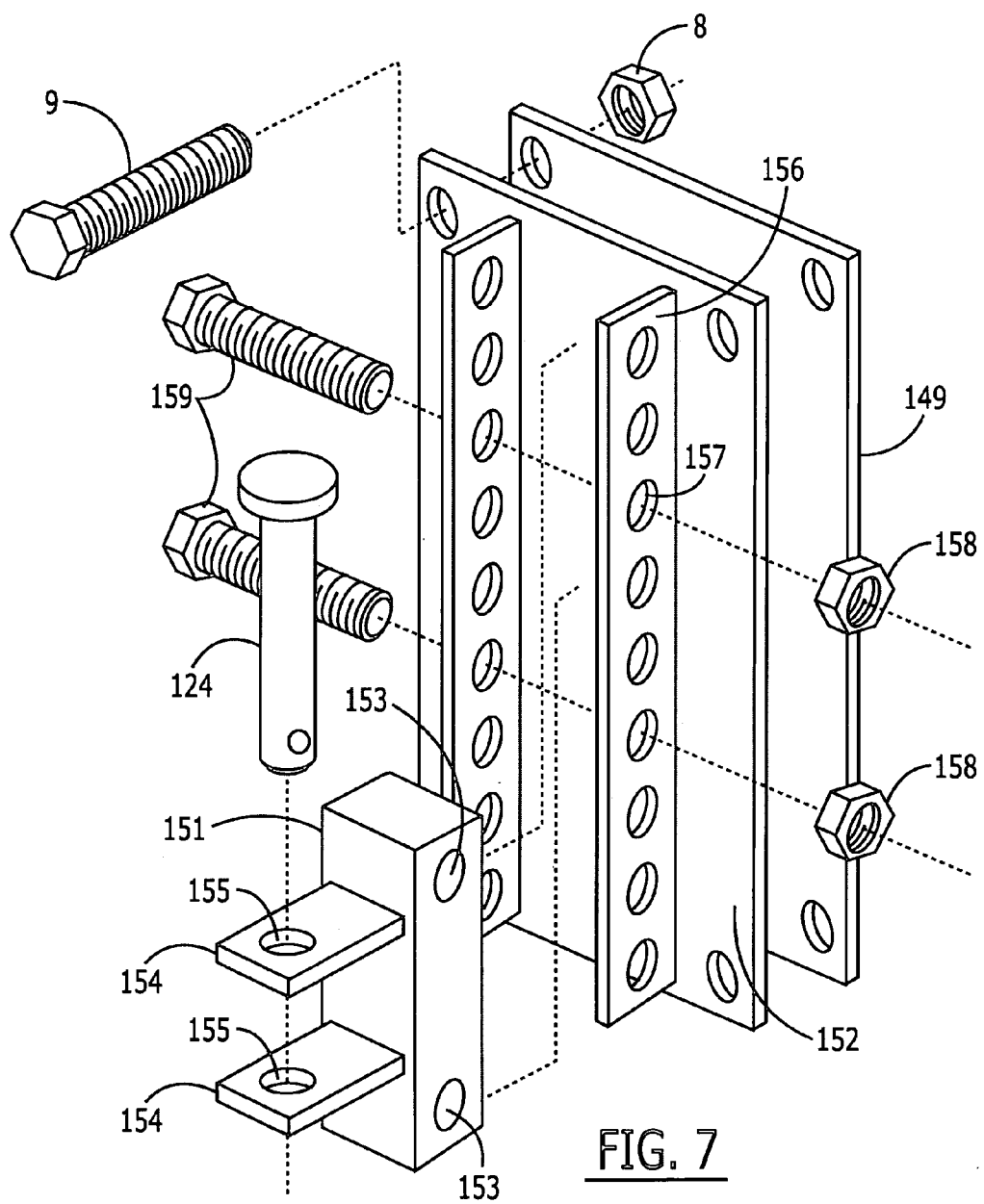
FIG. 7 shows an exploded perspective view of a further embodiment of a securing apparatus according to the present subject matter.

FIG. 7 shows a similar embodiment to the securing apparatus 50 shown in FIG. 6. A securing apparatus 150 has a mounting plate 152 having parallel locking walls 156 integral thereto. The parallel locking walls 156 have mounting apertures 157 which are properly aligned to receive and secure a receiver 151. The receiver 151 has parallel arms 154 which define apertures 155 therethrough to receive a hitch pin, or other fastening device, 124. Further, the receiver 151 also defines securing apertures 153 that may be aligned with the appropriate mounting apertures 157 to allow a securing bolt 159 to engage both the mounting apertures 157 and the securing apertures 153 to hold the receiver 151 in a proper position to receive a securing ring assembly. To secure the receiver 151 to the locking wall 156, a securing nut 158 is then tightened onto the end of the securing bolt 159 to lock the receiver 151 in place.

Other types of mechanisms that allow the receiver 151 to be adjustable may be used. For example, pins, springs, spring pins, etc. can be employed. Any such mechanisms that allow the receiver to be adjustable along a locking wall that is known in the art can be used and is considered within the scope of the present subject matter.

The mounting plate 152 may be attached to a side wall, preferably, a front side wall, of a towing vehicle in several different manners including permanently attaching the mounting plate 152 to the side wall through welding or some other known manner of attachment. In the embodiment shown in FIG. 7, a holding plate may be placed on the opposite of the side wall and securing bolts 9 may engage both the mounting plate 152 and the holding plate 149 by passing through the side wall of the towing vehicle. Securing nuts 8 may then be tightened onto the securing bolts 9 to secure the mounting plate 152 to the side wall of the towing vehicle. In such an embodiment, the securing apparatus 150 may be permanently attached to the vehicle while still allowing the receiver 151 to be adjustable in-height to accommodate different positions of the securing ring assembly on a small vehicle or to accommodate different sizes of small recreational vehicles.

By placing the securing apparatuses on towing vehicles as shown in FIGS. 1, 3 and 6 and not to the bed of the towing vehicle, several benefits can be realized. For example, as shown in FIG. 8A, the small recreational vehicle 70 is attached to a front wall 68 of a towing vehicle, in particular, a truck 60. By having the small recreational vehicle 70 attached to a securing apparatus 80 on the front wall 68 of the flatbed 66 of the vehicle 60 then the placement of the small recreational vehicle 70 is optimized. First, the weight $G_1$ of the small recreational vehicle 70 is placed between the two load bearing points $L_1$ and $L_2$ of the axles 62 and 64 of the vehicle 60. This placement helps to stabilize the towing vehicle 60 during travel, especially when such vehicles are running at higher rates of speed. Even in such situations where the small recreational vehicle may not fall within these two load bearing points $L_1$, $L_2$, the position of the small recreational vehicle is still optimized due to the fact that as much of the weight $G_1$ of the small recreational vehicle 70 as possible is placed between these two load bearing points $L_1$, $L_2$.

In a similar manner, a securing apparatus 180 shown in FIG. 8B optimizes the placement of the weight of $G_2$ of a small recreational vehicle 170 between the two load bearing points $L_3$ and $L_4$ of the towing vehicle configuration shown. An automobile 161 may tow a trailer 160, which has a flatbed 166 and a tongue 165. By placing the securing apparatus 180 on the tongue 165 of the trailer 160, the small recreational vehicle 170 can be placed at the very front of the trailer bed 166 to insure that the placement of the weight $G_2$ of the recreational vehicle 170 is optimized between the back axle 162 of the automobile and the axle 164 of the trailer. Again, this placement helps to stabilize the trailer 160 as it is being pulled by the automobile 161, especially at higher rates of speeds. As stated with the truck shown in FIG. 8A, even if all the weight $G_2$ of the small recreational vehicle 170 does not fall between the load bearing points $L_3$ and $L_4$, at least the most optimal amount of such weight will reside between the load bearing points $L_3$ and $L_4$ due to the placement of the small recreational vehicle 170 at the front of the flatbed 166. In this manner the small recreational vehicle can be more safely transported to the areas where it will be used.

As illustrated in FIGS. 8A and 8B, a further benefit is the storage area still available after placement of the small recreational vehicles 70, 170 on the flatbed 66, 166. The extra space allows other equipment and devices or goods to be placed on the bed 66, 166 behind the small recreational vehicles. Thereby, the space available on the flatbed 66, 166 can be optimized.

It would be appreciated by those skilled in the art that various modifications and variations can be made in the present invention without departing from the scope of the invention. It is intended that the present invention includes such modifications and variations as come within the scope of the appended claims and their equivalents.

The invention claimed is:

1. An apparatus for securing a small recreational vehicle to a bed of a towing vehicle, said apparatus comprising:
   a mounting shaft extending in a longitudinal length and having a first end and a second end at opposing ends of said longitudinal length;
   a mounting base integral to said shaft at said first end, said mounting base configured to be attachable around a tongue of said towing vehicle by a holding plate so that said second end of said shaft extends above said bed of said towing vehicle;
   a U-shaped receiver operably attachable to said shaft by securing bolts, said u-shaped receiver having parallel arms extending outward from said shaft when said receiver is attached to said shaft and said receiver being adjustable along said shaft to accommodate small recreational vehicles of different heights;
   said parallel arms each defining a locking aperture which are in parallel alignment with each other;
   a securing ring attachable to said small recreational vehicle, said securing ring defining a ring aperture and filling between said extending arms of said U-shaped receiver when said small recreational vehicle is placed on said bed of said towing vehicle, said securing ring extending past said apertures defined in said parallel arms so that said locking apertures and said ring aperture are aligned; and
   a removable fastening device positionable through both said locking apertures of said parallel arms and said ring aperture of said securing ring to hold said small recreational vehicle on said bed of said towing vehicle.

2. An apparatus as in claim 1, wherein said fastening device is a hitch pin.

3. An apparatus as in claim 1, wherein said securing ring is lockable to said receiver.

4. An apparatus as in claim 1, wherein said towing vehicle is a trailer.

5. An apparatus as in claim 4, wherein said mounting shaft is attachable to a tongue of said trailer.

6. An apparatus as in claim 1, wherein said securing ring is removably attachable to allow said securing ring to be positioned at different locations on said small recreational vehicle.

7. An apparatus as in claim 1, wherein said securing ring is mounted on a ring plate that is attachable to said small recreational vehicle.

8. An apparatus as in claim 7, wherein said ring plate is mountable to different parts of said small recreational vehicle.

9. An apparatus as in claim 7, wherein said ring plate is mountable to a bush guard of said small recreational vehicle by engaging a holding plate.

10. An apparatus as in claim 1, wherein said mounting shaft comprises a unitary structure.

* * * * *